(12) United States Patent
Brzoska et al.

(10) Patent No.: US 7,624,754 B2
(45) Date of Patent: Dec. 1, 2009

(54) DOUBLE-DISK SLIDE VALVE

(75) Inventors: Ekkehard Brzoska, Mülheim (DE); Norbert Marx, Düren (DE); Friedel Heller, Hürtgenwald (DE)

(73) Assignee: Z & J Technologies GmbH, Duren (DE)

( * ) Notice: Subject to any disclaimer, the term of this patent is extended or adjusted under 35 U.S.C. 154(b) by 0 days.

(21) Appl. No.: 12/392,230

(22) Filed: Feb. 25, 2009

(65) Prior Publication Data

US 2009/0159138 A1 Jun. 25, 2009

Related U.S. Application Data

(63) Continuation of application No. 11/050,643, filed on Feb. 3, 2005.

(30) Foreign Application Priority Data

Feb. 4, 2004 (DE) .................. 20 2004 001 674 U

(51) Int. Cl.
*F16K 51/00* (2006.01)
(52) U.S. Cl. .................. 137/334; 137/341; 251/196
(58) Field of Classification Search .............. 137/241, 137/334, 341; 251/196, 175
See application file for complete search history.

(56) References Cited

U.S. PATENT DOCUMENTS

| 2,148,628 | A | 2/1939 | Laurent |
| 2,705,610 | A | 4/1955 | Hjulian |
| 3,018,789 | A | 1/1962 | Pagonis |
| 3,314,442 | A | 4/1967 | Volpin |
| 4,124,194 | A | 11/1978 | Alvarez et al. |
| 4,291,862 | A | * 9/1981 | Alvarez et al. .............. 251/167 |
| 4,401,292 | A | 8/1983 | Whaley et al. |
| 4,570,670 | A | * 2/1986 | Johnson ..................... 137/553 |
| 5,116,022 | A | 5/1992 | Genreith |
| 5,908,046 | A | 6/1999 | Mosman |
| 5,927,684 | A | 7/1999 | Marx et al. |
| 5,971,358 | A | 10/1999 | Kennedy |
| 6,805,152 | B2 | 10/2004 | Kanzaka et al. |

FOREIGN PATENT DOCUMENTS

| DE | 86 85 43 | 2/1953 |
| DE | 11 16 003 | 1/1954 |
| DE | 80 08 316 | 7/1980 |
| DE | 84 00 339 | 8/1985 |
| DE | 40 11 274 | 4/1990 |
| DE | 296 23 103 U1 | 11/1996 |
| DE | 197 23 962 C2 | 6/1997 |
| EP | 0 450 646 | 4/1991 |
| FR | 13 20 689 | 1/1963 |
| GB | 390711 A | 4/1933 |
| GB | 713699 A | 8/1954 |

* cited by examiner

*Primary Examiner*—Kevin L Lee
(74) *Attorney, Agent, or Firm*—Alston & Bird LLP

(57) ABSTRACT

A double-disk slide valve, the shut-off plates of which are displaceable by means of an actuator rod and which is provided with a bridging pipe having two sealing rings that are in operative engagement with corresponding housing sealing seats of the slide valve housing when the slide valve is in the open position. At least one of the two housing sealing seats rests, by the action of a resilient element, under predetermined pressure against the sealing ring(s) associated with the bridging pipe when the slide valve is in the open position and against the peripheral edge of the shut-off plate(s) when the slide valve is in the closed position.

2 Claims, 5 Drawing Sheets

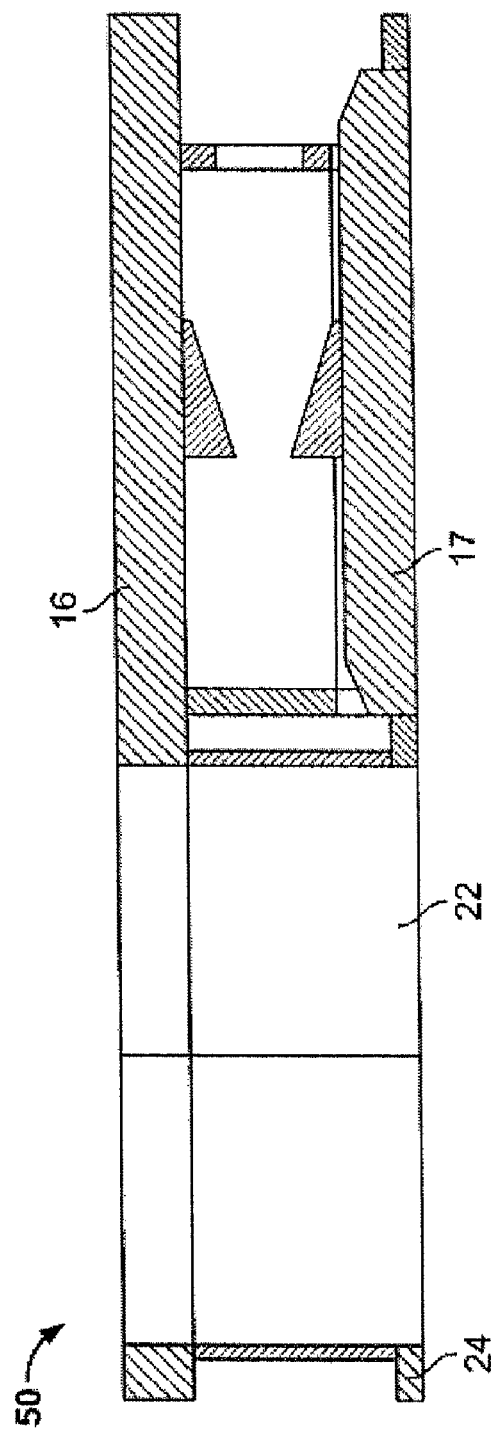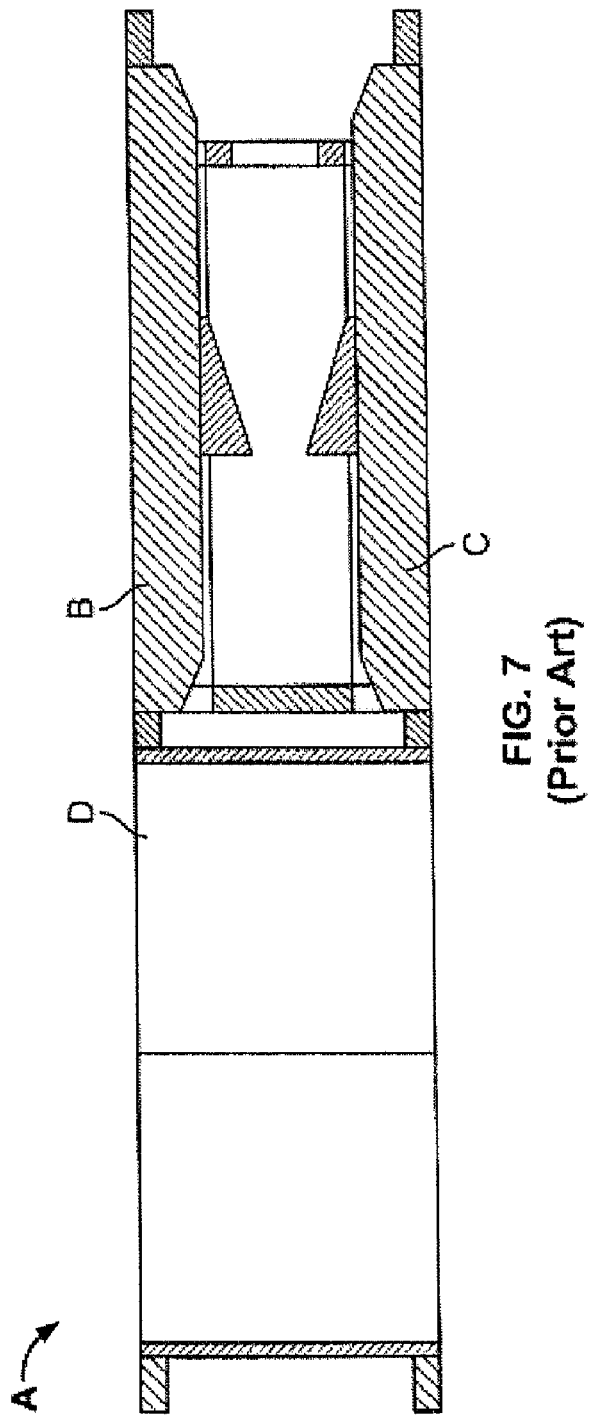

DOUBLE-DISK SLIDE VALVE

CROSS REFERENCE TO RELATED APPLICATION

This application is a continuation of U.S. application Ser. No. 11/050,643, filed Feb. 3, 2005, which claims priority to German Application No. 202004001674.5, filed Feb. 4, 2004, both which are hereby incorporated herein in their entirety by reference.

TECHNICAL FIELD

The present invention relates to a double-disk slide valve having shut-off plates displaceable by means of an actuator rod and which is provided with a bridging pipe having two sealing rings that are in operative engagement with corresponding housing sealing seats of the slide valve housing when the slide valve is in the open position.

INDUSTRIAL APPLICABILITY

Double-disk slide valves are used for, for example, in coal gasification plants, incineration plants, coking plants, chemical plants, pipelines and the like.

BACKGROUND ART

Double-disk slide valves of this kind are known and are available in the form of flat, oval and round slide valves.

Double-disk slide valves are generally used when it is required to seal the throughflow space of a slide valve relative to the remainder of the housing interior when the slide valve is in the open position. This is particularly the case when a stream of gas with contaminants of subliming substances is involved, because such contaminants can otherwise accumulate in non-sealed parts of the housing and may result in a blockage and accordingly may impede the operation of the slide valve. Double-disk slide valves are used for the same or similar reasons in the case of dust-containing gases or in the case of severely contaminated liquid media, such as, for example, in coal gasification plants, incineration plants, coking plants, chemical plants, pipelines and the like.

As mentioned above, double-disk slide valves in accordance with the preamble of claim 1 are known. For example, DE-C-868 543 discloses a double-disk slide valve in which the bridging pipe is composed of a resilient corrugated pipe having sealing rings arranged at the ends. The bridging pipe is housed in a tubular housing component of a slide valve disk, which serves simultaneously as holding means and guide means for the bridging pipe. When the slide valve is in the open position, the sliding rings are pressed against the housing sealing seats by the resilience of the corrugated pipe and by the expanding action of a wedge device.

That known structure has the disadvantage that in order to achieve a sufficiently good seal the bias of the resilient corrugated pipe has to be relatively high. The consequence is that when the bridging pipe is displaced, its sealing rings slide along the opposing sealing seats of the slide valve housing with a relatively high contact pressure. This creates considerable friction between the abutting sealing faces, so that substantial operating forces are required to switch over the slide valve. The wear to the sealing faces is also correspondingly high.

In order to avoid those disadvantages, it is proposed in DE-U-800 8316 that the sealing rings of the bridging pipe be mounted on an extension of the actuator rod for the slide valve disk and be provided with a restoring device. The restoring device has rollers attached to the sealing rings, which rollers run on actuating bars mounted in the housing and having lead-in grooves for the rollers arranged in the region of the slide valve passageway. Such a combined expanding and releasing device is intended firstly to ensure reliable contact pressure of the sealing rings when the slide valve is in the open position and secondly to ensure that the bridging pipe is freely movable along the two housing sealing seats on actuation of the slide valve.

In the double-disk slide valve mentioned above, however, this is achieved only by a very high level of structural complexity. For example, it is proposed that the shut-off plates of the slide valve disk be provided with rollers which in the closed position run in the lead-in grooves of the actuating bars in order that, especially in the event of high differential pressures, the shut-off plates are displaced with the lowest possible friction and without damage to the sealing faces. In such a double-disk slide valve it is necessary for a large number of individual components to be matched to one another in respect of their sequences of movement, with the result that such a double-disk slide valve has to be manufactured with the greatest precision. A large number of wearing components and components requiring intensive maintenance, that is to say components that require separate cleaning after a predetermined in-use period, increase the cost of using such a double-disk slide valve.

A double-disk slide valve of the kind described above having a reduced number of components, which is intended to ensure an unaltered high level of sealing between the sealing rings of the bridging pipe and the associated sealing seats of the slide valve housing when the slide valve is in the open position, is disclosed in EP 0 450 646 A2. That double-disk slide valve has a bridging pipe having two sealing rings joined to one another by a compensator, the sealing rings being arranged to be pressed under resilient bias against the sealing seats of the slide valve housing when the slide valve is in the open position. The compensator comprises a wave-like curved pipe component having an indentation extending around its circumference; the wave-like curved pipe component extending as an outer pipe component coaxially around an inner pipe component which is rigidly connected only to one of the two sealing rings. The latter pipe component is movable axially relative to the other sealing ring. Such a structure has proved satisfactory but still requires a certain amount of maintenance, it generally being necessary to remove the entire bridging pipe from the slide valve for maintenance, which gives rise to great expense both in terms of personnel and in terms of long down times.

OBJECTIVE OF THE INVENTION

The objective of the present invention is to provide a double-disk slide valve which, while having an unaltered high level of sealing between sealing rings of the bridging pipe or shut-off plates and associated housing sealing seats of the slide valve housing, has a structure that is as simple, cost-effective and easy to maintain as possible.

SUMMARY OF THE INVENTION

The invention provides a double-disk slide valve comprising:

first and second shut-off plates,
an actuator rod operable to displace said shut-off plates, a bridging pipe having two sealing rings that are in operative engagement with corresponding housing sealing seats of the slide valve housing when the slide valve is in the open position, wherein:

at least one of the two housing sealing seats rests, by the action of a resilient element, under predetermined pressure against the sealing ring(s) associated with the bridging pipe when the slide valve is in the open position and against the peripheral edge of the shut-off plate(s) when the slide valve is in the closed position.

That construction achieves the objective of the invention. Preferred developments and embodiments are described in the subsidiary claims.

An important aspect of the invention is accordingly that at least one of the two housing sealing seats is pressed, by the action of a resilient element, under predetermined pressure against the sealing ring(s) associated with the bridging pipe when the slide valve is in the open position and against the peripheral edge of the shut-off plate(s) when the slide valve is in the closed position. As a result, while having a simple structure and low maintenance costs, the sealing action achieved at least remains equally as good as or is even better than in the case of the prior art.

In a preferred embodiment, the resilient element comprises at least three spring assemblies, especially cup spring assemblies, distributed uniformly around the periphery of the housing sealing seat(s). The uniform distribution of at least three spring assemblies around the periphery of the housing sealing seat(s) ensures a uniform sealing action around the entire periphery of the housing sealing seat. Cup springs additionally have the advantage that they are robust and cost-effective to produce.

In a further preferred embodiment, at least the inner side(s) of one or both of the pipe sockets attached to the slide valve housing and/or the bridging pipe, that is to say at least their side(s) facing the medium flowing through the double-disk slide valve, has(have) been hardened or provided with wear-resistant and corrosion-resistant hard armouring. This ensures that the surfaces coming into contact with the medium flowing through the bridging pipe slide valve are subject to as little wear as possible. This is especially advantageous in the case of aggressive liquids and/or gases.

At least one of the peripheral edges of the pipe sockets facing the shut-off plates is preferably in the form of a cutting edge. This enables contaminants on the shut-off plates or on the bridging pipe to be removed in a simple manner when the slide valve is opened and closed.

Preferably, flushing steam or sealing steam is introducible between housing sealing seat and cutting edge by means of a flushing and sealing steam channel. The flushing steam or sealing steam removes deposits both from the cutting edge(s) and from the sealing seats.

In a further preferred embodiment, the housing sealing seat(s) is (are) movable relative to the associated pipe socket parallel to the direction in which it runs, i.e. axially. Furthermore, preferably at least one of the housing sealing seats is removable and thus exchangeable, access being gained to the resilient element after removal of a housing sealing seat. Such a structure ensures simple and cost-effective maintenance of the slide valve; any components that have to be exchanged, such as the housing sealing seat or the resilient elements, are readily accessible and can quickly be replaced.

In an arrangement of two shut-off plates, when the slide valve is in the closed position they are preferably arranged to be pressed against the associated sealing faces by wedge members that are centred by means of a ball. Such a wedging principle ensures a reliable sealing action using simple means.

In a further preferred embodiment, an actuator rod associated with the shut-off plates extends fluid-tight into the slide valve housing, which allows the interior or the slide valve to be acted upon by pressure (for example pressurised gas, flushing steam or sealing steam).

On the slide valve housing there is preferably provided at least one connection for connecting to a source of pressurised gas or flushing or sealing steam, by means of which pressurised gas or flushing or sealing steam can be made available for flushing or for additional sealing of the slide valve housing. The flushing or sealing steam allows simple cleaning of the slide valve, while the introduction of pressurised gas in turn facilitates an even better and more reliable sealing action.

In a further preferred embodiment, the slide valve housing has at least one maintenance aperture that can be closed by a cap, thereby rendering the maintenance of the slide valve simple and time-saving.

Preferably, the resilient element and the sealing seat are combined to form a seat unit which is connectable to the slide valve housing. This embodiment of the invention exhibits particular ease of mounting/demounting, because the complete seat unit can be mounted or demounted. Because it is therefore unnecessary to mount or demount the resilient element and the sealing seat separately, a smaller number of components needs to be handled, so that mounting/demounting are considerably simpler and quicker.

In a preferred embodiment of the invention, the seat unit comprises an annular insert which is connectable to the slide valve housing, in which the resilient element and the sealing seat are arranged. The annular insert allows especially simple and robust combination of the resilient element and the sealing seat. Since, furthermore, the resilient element and the sealing seat can be pre-mounted in the annular insert, this embodiment represents a further simplification of the mounting process.

The annular insert can have a receptacle for the resilient element, a wall of the receptacle that extends substantially radially in cross-section being formed by the sealing seat which acts as a stop surface for the resilient element. The fact that the receptacle for the resilient element is at least partly defined by the sealing seat allows direct connection of the resilient element to the sealing seat and results in an especially compact construction of the annular insert and accordingly of the housing in the region of the pipe socket.

Furthermore, a wall of the receptacle for the resilient element that extends substantially axially in cross-section can be formed by a housing ring, which at least partly defines the respective pipe socket in the peripheral direction. The housing ring likewise enables the slide valve to have an especially compact structure, because the resilient element mounted in the annular insert can thus be arranged close to the inner surface of the pipe socket.

In a further preferred embodiment of the invention, the annular insert has a receptacle for the sealing seat, there being provided in the receptacle for the sealing seat an opening which allows operative connection between the sealing seat and the resilient element. The opening has the advantage that the resilient element and the sealing seat cooperate directly, without the intermediate arrangement of further transmission elements, so that the seat unit is of simple and robust construction.

Preferably, the sealing seat has a guide ring and a concentrically arranged sealing ring, the sealing ring and the guide ring being releasably connected. The guide ring and the sealing ring allow the guiding and sealing functions of the sealing seat to be decoupled; the guide ring can be used for axial guidance of the sealing seat in the annular insert on transmission of the spring force exerted by the resilient element on the slide valve seat, while the sealing ring provides essentially only the seal between the housing and the bridging pipe or the respective shut-off plate. Since the two components, guide ring and sealing ring, can be machined separately and specifically to match their function, especially with respect to the machining of the guiding and sealing faces, the production of the sealing seat as a whole is facilitated. In addition, the sealing ring, which is subject to especially severe wear, can be simply removed from the guide ring when necessary for repair purposes or for maintenance work, without it being necessary to dismantle the entire seat unit.

The annular insert can also have at least one bore for connecting to a flushing steam or sealing steam connection, so that the seat unit, that is to say the annular insert and the resilient element arranged therein as well as the sealing seat, can be acted upon by pressurised gas for flushing or for improving the sealing.

The invention further provides a double-disc slide valve comprising shut-off plates and an associated disc cage, wherein at least one of the shut-off plates is integrally formed with this disc cage.

Such a construction has the advantage that dust, in particular coke dust is prevented from entering the inside of the disc cage. Moreover, the deposition of coke dust between the shut-off plate and the disc cage can be effectively avoided, such that the double-disc slide valve according to the invention requires reduced maintenance.

According to another aspect of the invention, at least the upper shut-off plate 17 is heatable. It is therefore possible to stop the contents of the coke drum from adhering to the shut-off plate.

BEST MODE FOR CARRYING OUT THE INVENTION

The invention will be described by way of example below in respect of further advantages and features and with reference to the accompanying drawings.

BRIEF DESCRIPTION OF DRAWINGS

In the drawings:

FIG. 6 is a longitudinal section through a disc cage for a double-disk slide valve in accordance with an embodiment of the invention; and FIG. 7 is a disc cage according to the state of the art.

FIGS. 1, 2 and 3 show different views of an embodiment of a double-disk slide valve 10 according to the invention. In addition, FIG. 4 shows a detailed view of the region indicated by Y in FIG. 1.

Figure 1:
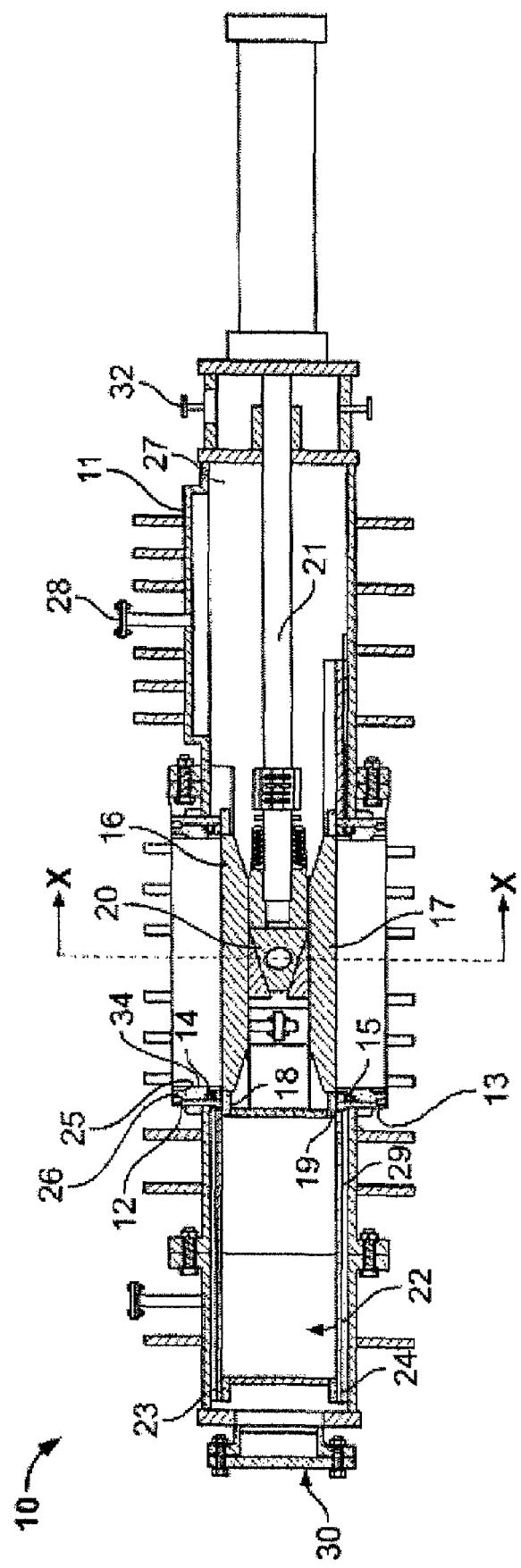
FIG. 1 is a longitudinal section through a double-disk slide valve in accordance with an embodiment of the invention.

Referring to the accompanying drawings, the double-disc slide valve 10 shown has a slide valve housing 11 having an upper and a lower pipe socket 12, 13 and an upper and a lower housing sealing seat 14, 15, between which there are displaceably mounted an upper and a lower shut-off plate 16, 17 having an upper and a lower sealing ring 18, 19, respectively. The two shut-off plates 16, 17 are arranged to be pressed against the housing sealing seats 14, 15 with the aid of an internal wedge 20 acting as expander element, which internal wedge is seated at the end of an actuator rod 21 and is rigidly joined thereto. The shut-off plates 16, 17 are for that purpose expandable by the internal wedge 20, which is centred by means of a ball, in accordance with a "wedge-within-wedge" principle. Such a structure ensures that the slide valve is easy to operate even under the most difficult thermal and dynamic conditions. The arrangement cannot become jammed, because the internal wedge 20 has a non-self-locking shape.

Next to the shut-off plates 16, 17 and the internal wedge 20 there is arranged a bridging pipe 22 which has an upper and a lower sealing ring 23, 24. The bridging pipe 22 is in the form of a hollow cylinder, that is to say it has no undulations especially on its inner side, so that no loss of flow can be caused as a result (see in this connection also FIG. 3).

An important aspect of the described double-disk slide valve 10 is a resilient element in the form of cup spring assemblies 25. The cup spring assemblies 25 are arranged on the upper pipe socket 12 on its inner side between the upper housing sealing seat 14 and a contact surface 26 associated with the upper pipe socket 12. For better understanding and greater clarity, reference is made at this point to the detailed view in FIG. 4. By means of the cup spring assemblies 25, the upper housing sealing seat 14, which is arranged to be movable or displaceable relative to the upper pipe socket 12 parallel to the direction in which it runs, i.e. axially, is pressed against the peripheral edge of the upper shut-off plate 16 or the upper sealing ring 23 of the bridging pipe 22, depending upon the slide valve position.

The cup spring assemblies 25 are distributed uniformly around the entire periphery of the upper housing sealing seat 14 or the upper pipe socket 12 in order to ensure a reliable closing function of the double-disk slide valve 10 resulting from the upper housing sealing seat 14 being pressed uniformly against the upper shut-off plate 16 or its sealing ring 18 (when the slide valve is in the closed state) or against the upper sealing ring 23 of the bridging pipe 22 (when the slide valve is in the open position).

Figure 2:
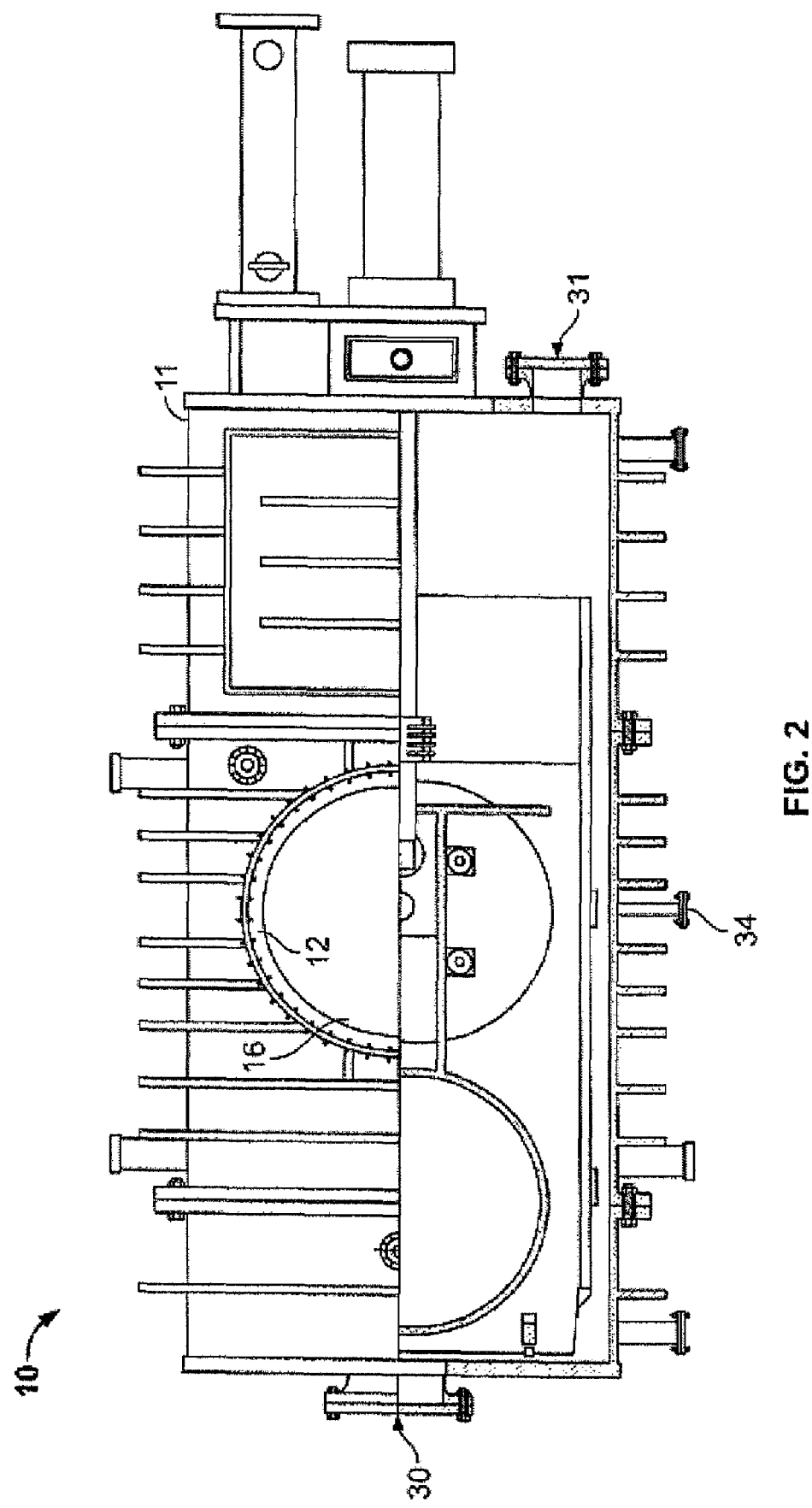
FIG. 2 shows the slide valve according to FIG. 1 in plan view and in half-section.

In FIGS. 1 and 2, the slide valve is shown in the closed position. The slide valve housing 11 is fluid-tight to the outside so that it is possible to establish in the interior 27 of the slide valve housing a gas pressure which may also be greater than the pressure in the slide valve passageway. For that reason, the actuator rod 21 extends fluid-tight into the slide valve housing 11. On the slide valve housing 11 there is arranged a connection 28 for connecting to a source of pressurised gas (not shown), especially a source of flushing and sealing steam. By continuously flushing the interior 27 of the slide valve housing 11, baking-on of contaminants and resulting malfunctions in the slide valve and in the plant equipped with the slide valve is avoided. The sealing faces of the sealing rings 23, 24 on the one hand and the housing sealing seats 14, 15 on the other hand are each arranged extending parallel to the direction of operation of the slide valve. In order to increase wear resistance, the above-mentioned components are hardened or armoured in a manner known per se.

The shut-off plates 16, 17 are movably arranged in a spectacles-shaped plate box (not shown in the Figures) which provides for their mounting. The plate box is guided between guide plates 29, thus avoiding penetration of contaminants into the housing.

Maintenance apertures 30, 31 allow ready access especially to the bridging pipe 22 for observation purposes or the like, During operation of the plant in which the slide valve is integrated, the maintenance apertures 30, 31 are normally provided with blind flanges or housing caps in order that the housing can thus be acted upon by pressurised gas or sealing or flushing steam, as described above.

The actuator rod 21 can be cooled, especially at its end projecting out of the housing, by means of a coolant inlet 32. This is preferably effected by cold air or cold gases. It may be mentioned at this point that cooling with a liquid is also a possibility.

Figure 3:
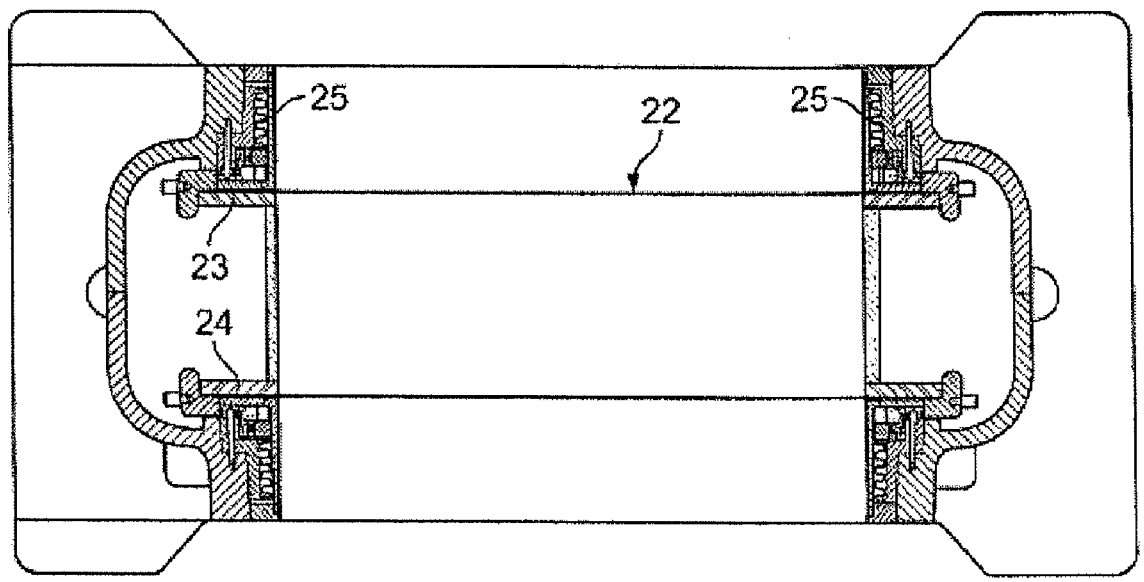
FIG. 3 is a section through the slide valve shown in FIG. 1 along the line X-X.

FIG. 3 shows the double-disk slide valve 10 in its opened position along section line X-X in FIG. 1. Here it can clearly be seen that the bridging pipe 22 joins the upper pipe socket 12 to the lower pipe socket 13 without any narrowing of cross-section. In addition to the sealing rings 23, 24 and the housing sealing seats 14, 15, it is also advisable for the entire inner side of the bridging pipe 33 to be hardened or armoured in order thus to prevent abrasive wear.

Figure 4:
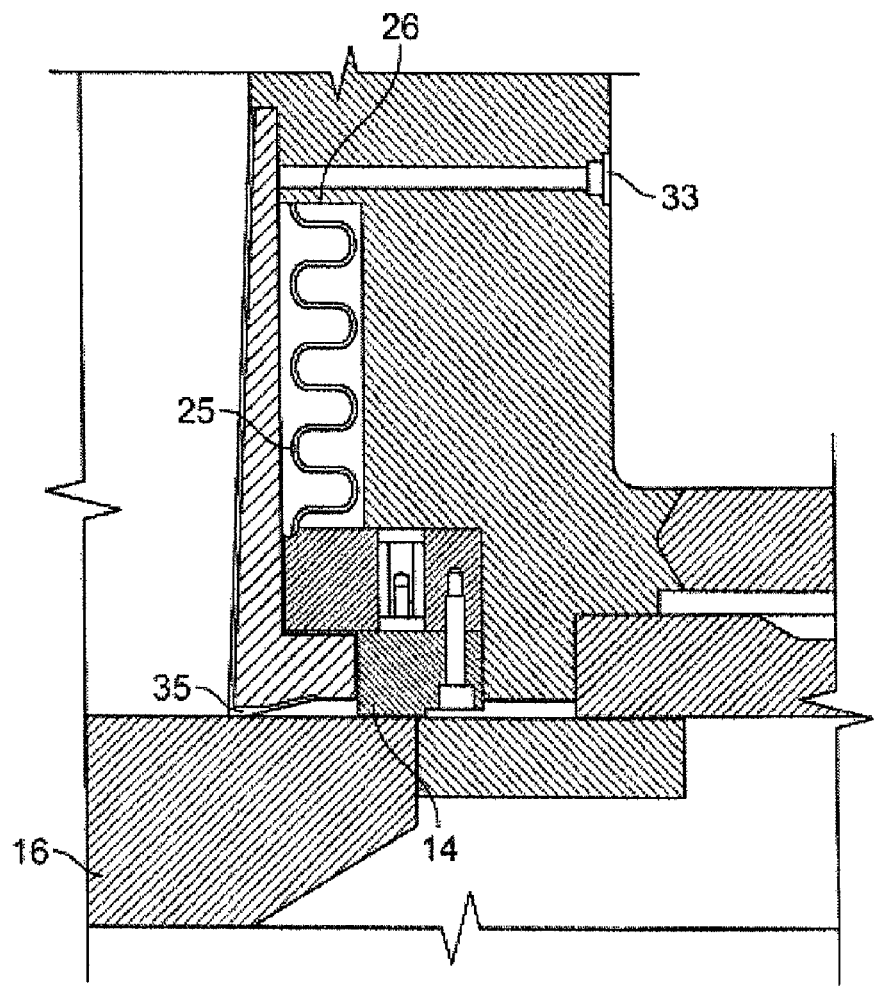
FIG. 4 is a detailed view of the portion indicated by "Y" in FIG. 1, especially a sealing seat.

The portion marked Y in FIG. 1 is shown on an enlarged scale in FIG. 4, which clearly shows a flushing and sealing steam channel 33 connected to a source of flushing and sealing steam at a connection nipple 34 (see FIG. 2). FIG. 4 also shows a cutting edge 35 which serves for eliminating any adhering deposits. The cutting edge has hard armouring. A hardened cutting edge 35 is also possible as an alternative. The cutting edge 35 extends on the inner side of the upper pipe socket 12 over its entire periphery or its entire peripheral edge and rests on the upper shut-off plate 16 when the slide+valve 10 is in the closed state. It should be noted that, if necessary, a cutting edge may of course also be provided on the lower pipe socket 13.

For the purpose of easier maintenance and quicker restart after maintenance, the housing sealing seat 14 is exchangeable, so that exchanging the housing sealing seat 14 and the cup spring assemblies 25 underneath it can be effected quickly and requires little work on the part of personnel. If necessary, the lower housing sealing seat 15 can also be exchangeable. In addition, it should be noted at this point that, again if necessary, it is of course also possible to arrange on the lower pipe socket 13 a movable (lower) housing sealing seat 15 and associated resilient elements, preferably in the form of cup spring assemblies, which are uniformly distributed around the periphery of the lower housing sealing seat 15.

It should also be noted that the flushing steam or sealing steam fed in by way of the flushing and sealing steam channel 33 is introduced between the upper housing sealing seat 14 and the cutting edge 35, so that deposits on the cutting edge 35 on the one hand and on the upper shut-off plate 16 or the pipe connection of the bridging pipe 22 on the other hand, depending upon the position of the slide valve, can be removed.

Figure 5:
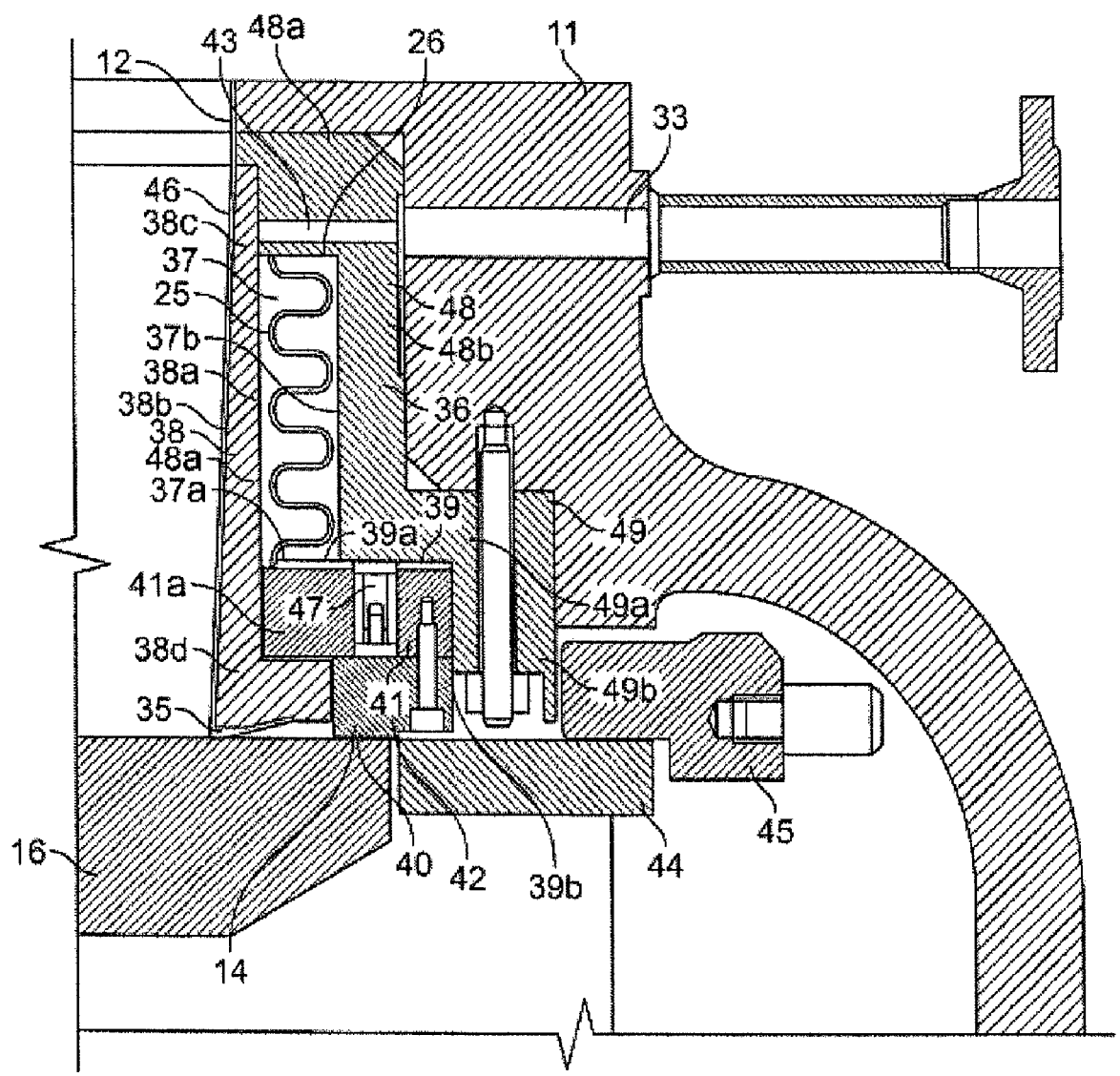
FIG. 5 is a further development of the sealing seat according to FIG. 4.

FIG. 5 shows a portion of the housing in the region of the upper (in the operating state) pipe socket 12 in which there is arranged a sealing seat 14, 15 that has been developed further in terms of ease of mounting/demounting. The concept underlying this embodiment is essentially that the resilient element and the sealing seat are combined to form a seat unit which is joined, for example screwed, to the slide valve housing 11. For mounting or demounting, the complete seat unit is installed or removed, which results in simpler mounting or demounting of the spring-biased sealing seat.

To this end the double disc slide valve 10 comprises two pipe sockets 12, 13 defining a fluid passageway on the housing side, a bridging pipe 22 and two shut-off plates 16, 17, by and into which pipe sockets 12, 13, for opening the double disc slide valve 10, said bridging pipe 22 and, for closing the double-slide valve 10, said two shut-off plates 14, 15 are movable, the end of at least one of the two pipe sockets, 12, 13 that cooperates with the bridging pipe 22 or the shot dash of plates 14, 15 having a sealing seat 14, 15 which is resiliently biased towards the bridging pipe 22 or the shut-off plates 16, 17 by the spring force of a resilient element 25 and the resilient element 25 and the seating seat 14, 15 being combined to form a seat unit which is connectable to the slide valve house 11.

"Seat unit" is to be understood here as meaning a unit comprising the elastic element 25 and sealing seat 14, 15, wherein this combination can be handled as a single component. The seat unit can consist of only the elastic element 25 and the seating seat 14, 15 or can comprise a further component which integrates the elastic element 25 and the seating seat 14, 15.

An especially simple and robust configuration of the seat unit is provided by an annular insert 36 in which the resilient element 25 and the sealing seat 14 are arranged. The invention is not limited to the annular insert 36 shown in FIG. 5 but also includes other configurations of the seat unit that allow combination of the resilient element and the sealing seat. Such different configurations may be stipulated, for example, by structural requirements arising from the form of housing of different slide valve types.

The sealing seat according to the invention can also be used in single-disk slide valves and generally in slide valves in which good sealing in the region of the pipe socket(s) combined with improved ease of mounting/demounting is an important factor.

The annular insert 36 is arranged in the pipe socket housing close to the shut-off plate 16 (closed position) shown in FIG. 5, which is part of the slide valve disk 44 guided by a guide device 45. The annular insert 36 is step-shaped, especially double-L-shaped, in cross-section and comprises an upper (in the mounted position) shoulder 48 and a lower shoulder 49. The upper shoulder 48 is arranged to the front in the direction of flow and the lower shoulder 49 is arranged to the rear in the direction of flow. The two limbs 48a, 48b of the upper shoulder 48 define a receptacle 37 for the resilient element 25 on the side remote from the fluid passageway, the radially extending limb 48a (radial limb) acting as upper stop surface for the resilient element 25, that is to say the cup spring assembly arranged in the receptacle 37. The axially extending limb 48b (axial limb) is longer than the radial limb 48a, the limb length generally being determined by the length of the resilient element 25.

In general, the terms "radial" and "axial" relate to the substantially cylindrical pipe socket 12 and the fluid passageway, an axially or radially extending limb being understood as a limb whose main extent is axial or radial, respectively. An axial or radial wall is to be understood as being a wall that defines a space in the axial or radial direction, respectively.

The two limbs 49a, 49b of the lower shoulder 49 define a receptacle 39 for the sealing seat 14 on the side remote from the fluid passageway. The radial limb 49a is shorter than the side of the sealing seat 14 that abuts the radial limb 49a, so that a portion 41a of the sealing seat 14 projects radially beyond the lower shoulder 49 in the direction towards the fluid passageway. The projecting portion 41a of the sealing seat 14 forms a further stop surface for the resilient element 25, which stop surface is arranged opposite to and parallel to the radial limb 48a of the upper shoulder 48, so that the resilient element is clamped between that of the upper shoulder 48 and the sealing seat 14 with a predetermined bias.

Otherwise the dimensions of the two limbs 49a, 49b of the lower shoulder 49 are governed by the measurements of the sealing seat 14.

In general, therefore, the step-shaped or double-l-shaped annular insert 36 acts as the housing-side boundary of the two receptacles 37, 39. The fluid-side boundary of the two receptacles 37, 39 is provided by a housing ring 38 which is joined to an end face of the upper shoulder 48, especially of the radial limb 48a, as can be seen in FIG. 5. The outer wall 38a of the housing ring 38 extends parallel to and concentrically with both the axial limb 48b of the upper shoulder 48 and the axial limb 49b of the lower shoulder 49. The inner wall 38b of the housing ring 38 defines the pipe socket 12 and is plated with a wear-resistant armouring 46. The cutting edge 35 is provided on the edge of the housing ring 38 that is lower in the direction of flow.

The housing ring 38 is substantially L-shaped, the length of the axial limb 38c of the housing ring 38 being so chosen that the free outer wall 38a of the housing ring 38 approximately covers the two axial limbs 48b, 49b of the annular insert 36. The length of the radial limb 38d of the housing ring 38 corresponds approximately to or is slightly shorter than the length of the radial limb 48a of the upper shoulder 49 of the annular insert 36.

The step-shaped cross-section of the annular insert 36 together with the above-described L-shaped cross-section of the housing ring 38 defines two receptacles 37, 39 which likewise have an L-shaped arrangement in cross-Section. The receptacles 37, 39 are accordingly in the form of two concentric annular gaps of different internal diameters. The two receptacles 37, 39 are joined by an annular opening 39a which is closed by the sealing seat 14, especially by the portion 41a of the sealing seat 14.

Through the opening 39a the resilient element 25 makes contact with the portion 41a of the sealing seat 14 and thus acts upon the sealing seat with the desired spring force.

Furthermore, by virtue of the above-described length of the radial limb 38d of the housing ring 38, the end face thereof is spaced apart from the axial limb 49b of the lower shoulder 49 so that a further opening 39b is formed in the receptacle 39 for the sealing seat 14, which opening is arranged radially further towards the outside than the opening 39a connecting the receptacles 37, 39. Through the further opening 39b a sealing face 40 of the sealing seat 14 makes contact with the machine element (bridging pipe 22, shut-off plates 16, 17) that is to be sealed.

The cross-section of the annular sealing neat 14 is substantially L-shaped, the sealing face 40 being provided on the end face of the axial limb of the sealing seat 14. The sealing seat 14 is installed in the receptacle 39 with axial play, so that a spring force exerted on the sealing seat 14 by the resilient element 25 causes the sealing face 40 of the sealing seat to be pressed against the bridging pipe 22 or the shut-off plates 16, 17.

The sealing seat 14 comprises a guide ring 41, which is screwed to a concentrically arranged sealing ring 42 having a smaller internal diameter than the guide ring 41. The sealing ring 42 can therefore easily be detached from the guide ring 41 when necessary for maintenance work or for repair purposes. The guide ring 41 is arranged to slide and to be guided axially between the wall 38a of the housing ring 38 and the inner wall of the axial limb 49b of the annular insert 36. In addition, the guide ring 41 has a device 47 for setting the axial play. The sealing ring 42 screwed to the guide ring 41 is arranged between the end face of the radial limb 38d of the housing ring 38 and the axial limb 49b of the lower shoulder 49 of the annular insert 36.

The invention is not limited to the annular insert 36 having the double-L-shaped cross-section shown in FIG. 5, but also includes components having other cross-sectional shapes that allow the resilient element 25 and the sealing seat 14 to be accommodated. For example, it is possible for the receptacles for the resilient element and the sealing seat to be T-shaped, the receptacle extending transverse to the longitudinal direction of the pipe socket being provided for the sealing seat and the receptacle extending axially with the longitudinal axis of the pipe socket being provided for the resilient element.

The bore 43 for connecting to a flushing steam or sealing steam connection, which bore is provided in the radial limb 48a of the upper shoulder 48 of the annular insert 36, can also be arranged at a different location on the annular insert 36 according to the particular structural circumstances.

The seat unit according to FIG. 5 can be used both for the upper pipe socket 12 and for the lower pipe socket 13.

FIG. 6 illustrates an embodiment of a disc cage wherein one of the two shut-off plates 16, 17 is integrally formed with the associated disc cage 50. This figure shows a disc cage 50 in a longitudinal section, detailed with its most important components. Such a disc cage 50 can, for example, be used with a double-slide valve according to FIG. 1 to FIG. 5. Thus, all of the features of the embodiment according to FIG. 6 are disclosed in combination with the embodiment according to FIGS. 1 to 5. Furthermore, it is possible to use the disc cage 50 according to FIG. 6, with a double-disc slide valve which differs from the embodiments according to FIG. 1 to FIG. 5.

At first, the disc cage according to FIG. 7, which represents an example for a conventional disc cage, will be described in order to explain the problem underlying the invention. It can be taken from FIG. 7, that the disc cage A comprises two shut-off plates B and C which are arranged adjacent to the bridging pipe D. In closed position, the two shut-off plates B and C, shut off the fluid passage of the double-disc slide valve. The bridging pipe D can be moved by and into the two pipe sockets 12, 13 to open the double-disk slide valve. The two shut-off plates B and C are loosely fitted in the disc cage A.

This conventional disc cage according to FIG. 7, has the drawback that coke dust can deposited in the gap between the upper shut-off plate B and the disc cage A.

That problem is overcome according to the invention by providing at least one of the shut-off plates 16, 17, in particular the upper shut-off plate 16, integrally formed with the disc cage 50; this is illustrated in FIG. 6 by way of example. Thus, the upper shut-off plate 16 is continuously formed as the surface of the disc in cage 50 such that no gap exists into which coke dust can enter. This means, that the upper sealing ring 23 of the bridging pipe 22 can be omitted, and the bridging pipe 22 is defined by a ring integrally formed with the upper shut-off plate 16, as shown in FIG. 6, The surface of the shut-off plate, and thus the surface of the disc cage, is machined all over as seat surface and is provided with a wear resistant hard facing over lay. The lower shut-off plate 17 can be formed as a slide plate which is loosely fitted into the disc cage 50, since there is no risk, due to the integral formation of the upper shut-off plate 16 with the disc in cage 50, that coke dust enters into the inside of the disc cage 50 and so no coke dust can reach the region of the lower shut-off plate 17.

The lower shut-off plate 17 can also be integrally formed with the disc plate 50. Such that the lower sealing ring 23 is replaced by a ring integrally formed with the lower shut-off plate 17, wherein the lower side of the disc cage 50 is machined as a sealing surface and provided with a wear resistant hard over lay.

The upper shut-off plate 17 can be heatable. In so doing, the problem that the plate 17 and the content of the coke drum stick together can be largely avoided. This embodiment can be considered independently, as well as in combination with all other embodiments described in this application.

Although the invention is described by way of an embodiment example having a fixed combination of features, it also includes other conceivable advantageous combinations of those features, as indicated especially, but not exhaustively, by the subsidiary claims. All features disclosed in the application documents are claimed as important to the invention insofar as they are novel, individually or in combination, compared with the prior art.

REFERENCE NUMERALS 10 double-disk slide valve
11 slide valve housing
12 upper pipe socket
13 lower pipe socket
14 upper housing sealing seat
15 lower housing sealing seat
16 upper shut-off plate
17 lower shut-off plate
18 upper sealing ring
19 lower sealing ring
20 internal wedge
21 actuator rod
22 bridging pipe
23 upper sealing ring
24 lower sealing ring
25 cup spring assembly (elastic element)
26 contact surface
27 interior of the slide valve housing
28 connection
29 guide plate
30 maintenance aperture
31 maintenance aperture
32 coolant inlet
33 flushing and sealing steam channel
34 connection nipple
35 cutting edge
36 annular insert
37 receptacle for the resilient element
37a axial wall of the receptacle
37b radial wall of the receptacle
38 housing ring
38a outer wall of the housing ring
38b inner wall of the housing ring
38c axial limb of the housing ring
38d radial limb of the housing ring
39 receptacle for the sealing seat
39a opening for the resilient element
39b opening for a sealing face of the sealing seat
40 sealing face of the sealing seat
41 guide ring
41a portion of the sealing seat
42 sealing ring of the sealing seat
43 bore for connecting to a flushing steam or sealing steam connection
44 slide valve disk
45 guide
46 plating
47 device for setting the axial play of the sealing seat
48 upper shoulder of the annular insert
48a radial limb of the upper shoulder
48b axial limb of the upper shoulder
49 lower shoulder of the annular insert
49a radial limb of the lower shoulder
49b axial limb or the lower shoulder
50 disc cage

The invention claimed is:

1. A double-disc slide valve, comprising:
a disc cage having opposed shut-off plates associated therewith, wherein one of the shut-off plates is integrally formed with the disc cage so as to be fixed with respect to the disc cage, and the other of the shut-off plates is movable with respect to the one of the shut-off plates.

2. A double-disc slide valve comprising:
an upper and lower shut-off plate, wherein at least the upper shut-off plate is operably engaged with a heat source such that at least the upper shut-off plate is heatable; and
a disc cage having the shut-off plates associated therewith, wherein the upper shut-off plate is integrally formed with the disc cage so as to be fixed with respect to the disc cage, and the lower shut-off plate is movable with respect to the upper shut-off plate.

* * * * *